United States Patent [19]

Felburn

[11] 4,383,698
[45] May 17, 1983

[54] STEERABLE TRAILER

[76] Inventor: John P. Felburn, P.O. Box 2344, Arlington, Va. 22202

[21] Appl. No.: 247,398

[22] Filed: Mar. 25, 1981

[51] Int. Cl.³ .............................................. B62D 13/02
[52] U.S. Cl. .................................. 280/426; 280/80 B; 280/423 R
[58] Field of Search .................. 280/423 R, 426, 419, 280/80 R, 80 B, 81 A, 81 B

[56] References Cited

U.S. PATENT DOCUMENTS

| | | | |
|---|---|---|---|
| 2,902,293 | 9/1959 | Felburn | 280/426 |
| 2,925,285 | 2/1960 | Haas | 280/426 |
| 2,959,428 | 11/1960 | Felburn | 280/426 |
| 3,002,636 | 10/1961 | Felburn | 280/404 |
| 3,403,925 | 10/1968 | Sauer | 280/81 A |

*Primary Examiner*—Joseph F. Peters, Jr.
*Assistant Examiner*—Donn McGiehan

*Attorney, Agent, or Firm*—Michael Williams

[57] ABSTRACT

The inventions disclosed herein are improvements over constructions shown in three previous patents issued to me, namely, U.S. Pat. Nos. 2,902,293, 2,959,428 and 3,002,636. The improvements herein disclosed relate to a truck trailer having a pair of spaced axles connected to the trailer frame. The front axle is rotatable about a vertically-disposed axis for steering purposes, and is totally self-contained, including its own suspension and a subframe which slidably engages the undersurface of the lower flanges of the two frame channels. When it is desired to adapt the trailer for "switch van" purposes (when the trailer frame and body supported thereon are slipped off the axles to be supported at a dock or on a railroad car) the subframe of the front axle is modified so that it supports both axles, but still has sliding engagement with the frame channel undersurfaces.

19 Claims, 16 Drawing Figures

STEERABLE TRAILER

BACKGROUND AND SUMMARY

My prior U.S. Pat. Nos. 2,902,293 and 2,959,428, disclose tractor trailers having a pair of spaced axles to support road-engaging wheels, one of the axles (usually the front axle) being swingable about a vertical pivot to provide for steering thereof in accordance with the angular displacement of the tractor from the longitudinal centerline of the trailer.

The majority of tractor trailers seen on the roads today are what are called "tandem-tandem" trailers. In this type of trailer a pair of closely-spaced axles are supported near the rear of the trailer bed for road-engaging wheels. The front of the trailer bed is supported on the rear of the tractor frame, such frame having a pair of closely-spaced axles for road-engaging wheels.

The "tandem-tandem" trailers have many disadvantages, a serious one being that the trailer axles are spaced so close together that the legal load capacity of the trailer is reduced because the load is applied to the road surface in a small area, and also at least one of the trailer axles is non-articulated. To overcome the load disadvantage, the trailer axles were spread apart a distance of nine feet or more to comply with jurisdictional regulations, but this brought about a more serious disadvantage in that in negotiating a turn or when travelling along a curving roadway, the tires under the axles of the trailer skidded or were dragged through the turn. This required a truck trailer of greater power; caused excessive tire wear; and presented a safety hazard during road travel, since the trailer could push the tractor into a jack knife.

To overcome the disadvantage above-mentioned, the front one of the spread axles was made to swing about a vertical pivot and this axle was connected to the rear of the truck tractor by steer links. This provided a very satisfactory trailer suspension and embodiments of the construction are shown in my U.S. Pat. Nos. 2,902,293 and 2,959,428. In both of said patents, the spread axles of the trailer were connected by walking beams to equalize for bumps in the roadway and although this had some advantages, it was costly to manufacture and maintain, whereas the air bag suspension of the construction herein disclosed provides the required cushioning.

My improved construction eliminates the walking beam connection without affecting the operability of the suspension. The invention disclosed herein makes it possible to separate the two axles, and making the front axle rotatable and totally self-contained, with its own suspension and subframe. The subframe engages the undersurface of the lower flange of the two longitudinally-disposed main channels and slides therealong during turning operations to accomodate for geometrical changes caused by angular relationship of the tractor and trailer.

The construction may be easily adapted for "switch van" operation, such as is shown in my U.S. Pat. No. 3,002,636. In such cases, the subframe is elongated to connect both of the trailer axles, but the subframe still slidingly engages the main frame channels, as before. In this case, both axles move longitudinally of the main frame and the steer bars draw the whole bogie which includes one steerable axle and one fixed axle.

DESCRIPTION OF THE DRAWINGS

In the drawing accompanying this specification and forming a part of this application, there are shown, for purpose of illustration, several embodiments which my invention may assume, and in these drawings.

DESCRIPTION OF THE PREFERRED EMBODIMENT

The improved transportation vehicle disclosed in FIGS. 1 through 7 comprises a tractor trailer T having frame 20 provided with the usual fifth wheel 21 which is adapted to receive the king pin 22 extending downwardly from the front of the trailer. The fifth wheel 21 and king pin 22 are of conventional construction and detailed disclosure is believed unnecessary. When the king pin is connected to the fifth wheel, the front end of the trailer Ta is supported on the rear of the tractor frame 20 in customary manner, so that the tractor draws the trailer bed and all fixedly-attached appertanences through the king-pin connection.

Figure 1:
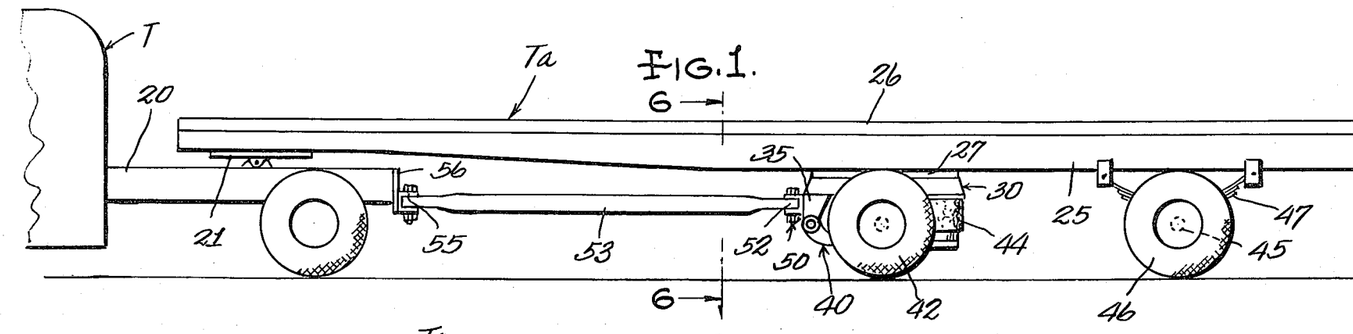
FIG. 1 is a small-scale side-elevational view of a tractor trailer illustrating one embodiment of my invention, the tractor being only partially shown.

The trailer Ta has a pair of longitudinally-extending, transversely-spaced heavy metal channels 25,25 upon which the floor 26 of the trailer is mounted and secured. As seen in FIG. 1 each channel 25, at its forward end, tapers to a reduced vertical size to provide for clearance of the fifth wheel 21.

A rather heavy steel supporting or pivot plate 27 underlies the bottom flanges of the channels 25 and is adapted to have sliding engagement with the undersurface of such bottom flanges. Toe plates 28 are held to the plate 27 by bolts 29 and are adapted to loosely clamp the bottom flange of each channel between it and the plate 27, whereby the plate 27 may slide in a direction longitudinally of the channels.

A subframe 30 carries the wheel axle 31 and this subframe comprises a flat top member 31 of a horizontal area substantially equal to the area of the plate 27. The member 31 and plate 27 have interengaging flat surfaces and a pivot bolt 32 passes through vertically-aligned openings so that the subframe 30 may rotate relative to the plate 27.

Figures 3, 4:
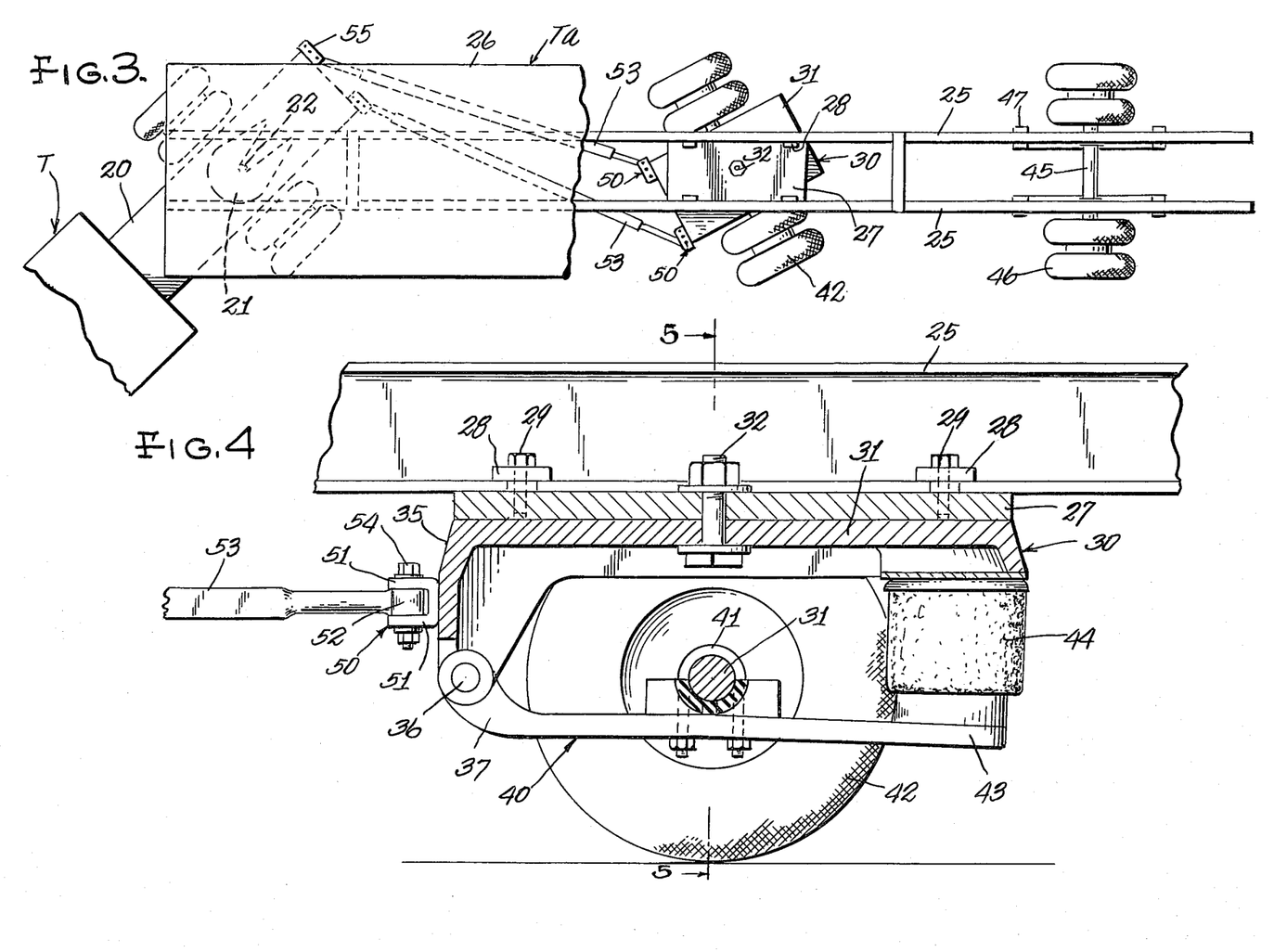
FIG. 3 is a top-plan view similar to FIG. 2, but showing the position of parts when the tractor trailer has been steered by the driver to make a turn of 45 degrees.
FIG. 4 is an enlarged sectional view corresponding to the line 4—4 of FIG. 2.
Figure 5:
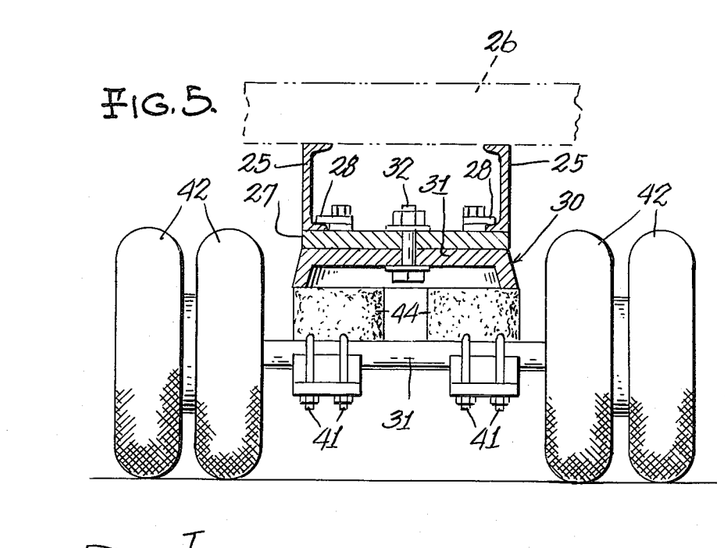
FIG. 5 is a sectional view corresponding to the line 5—5 of FIG. 4.
Figure 6:
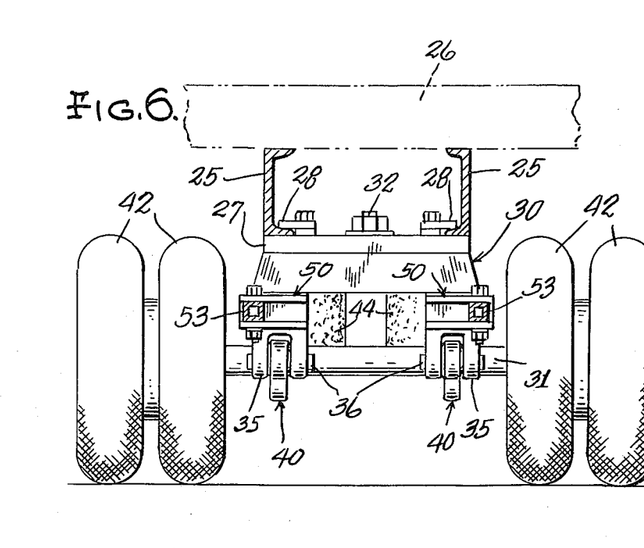
FIG. 6 is an enlarged sectional view corresponding to the line 6—6 of FIG. 1.

Integral with, and extending downwardly from, the top member 31 at the front end of the subframe are two bifurcated knees 35,35 each of the knees having horizontally-aligned openings which receive a stub shaft 36 held against displacement in any suitable manner. Each of the stub shafts 36 rotatably supports the forward end 37 of a carrier beam 40. The wheel axle 31 is secured to the intermediate portion of each beam by U-bolts 41, or the like, with cushioning rubber interposed between the axle and the beam, as shown in FIG. 4. Opposite ends of the axle 31 rotatably support the wheels 42, which include road-engaging tires.

A cushioning spring device is interposed between the rear end 43 of each beam and the overlying part of the top member 31 of the subframe 30. The cushioning device may take any suitable form, such as a coil spring or leaf spring. At the present time, it is preferred to form the cushioning device as an air bag 44 of conventional construction.

The construction thus far described provides a sturdy, yet not unduly heavy, totally self-contained rotatable axle, including its own suspension and subframe. The flat, interengaging surfaces of the plate 27 and top member 31 very stably support the weight of the trailer and the load imposed thereon. If desired, bearings of suitable type may be positioned between the flat, interengaging surfaces, although at the present time no bearings are needed.

The toe plate connections 28 provide effective connection of the plate 27 to the channels 25,25 for sliding movement along the undersurface of the lower flanges of the channels. This type of sliding movement is preferred over the constructions shown in my said U.S. Pat. Nos. 2,902,293 and 2,959,428, wherein the pivot pin slides within a slot formed in a plate which is fixedly connected to the frame channels, since the present construction is easier to manufacture and is more reliable in use.

As seen in FIG. 1, a rear axle 45 supports road-engaging wheels 46. The rear axle 46 has no connection with the forward axle 31 and the latter may rotate about the pivot bolt 32 or may slide in a direction longitudinally of the trailer frame without in any way affecting the rear axle. A spring connection is provided between the rear axle 45 and the trailer frame, and here again the spring may take any conventional form, like the air bag 44, or a coil spring, or as herein shown, a leaf spring connection 47. As seen in FIG. 1, the front and rear trailer axles have a wide spread therebetween (ten feet in the disclosed embodiment) in order to support the maximum legal load, and the rear of the trailer overhangs the rear axle by about six feet for a purpose to be disclosed.

Connected as by welding, to the forward side of each knee 35, is the web of a metal clevis 50, the legs 51 of this clevis being vertically spaced to receive therebetween an eye 52 on a respective steering link 53. As seen in FIG. 1, a greater portion of the length of each link is of square metal tube formation, with the opposed ends rounded in cross section for integral connection with an eye 52. A bolt 54 extends through vertically-aligned openings in the flanges 51,51 and through the opening of the eye 52 to hold the link to the clevis for movement in a substantial horizontal direction. Preferably, a rubber bushing (not shown) is interposed between the bolt 54 and the eye 52 to absorb shock. As suggested in FIG. 2, the spaced flanges 51 of each clevis have a plurality of openings (three shown) to provide for lateral adjustment of the ends of the steering links 53.

Figure 2:
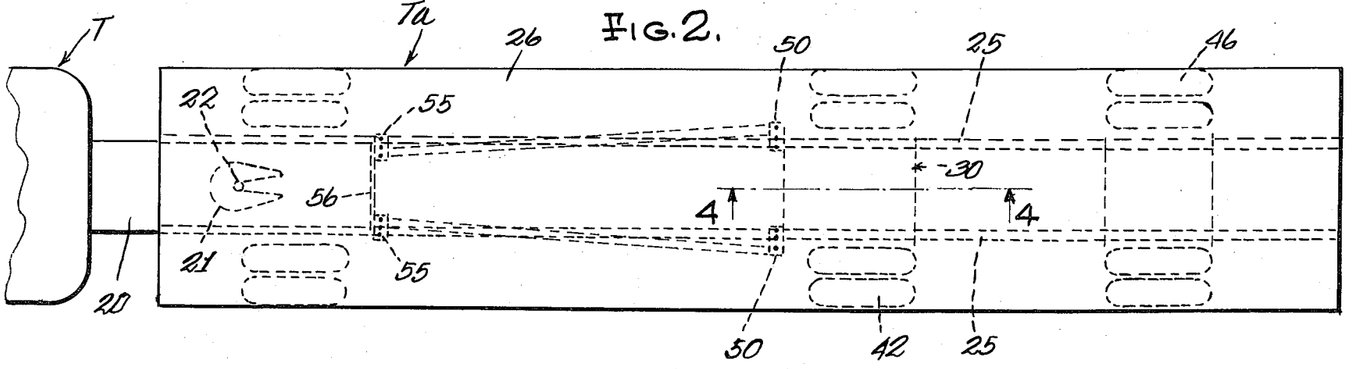
FIG. 2 is a top-plan view of the tractor trailer shown in FIG. 1.

As seen in FIGS. 1 and 2, the forward ends of the two steering links are connected to clevises 55,55 which may be the same as the clevis 50. The clevises 55 are welded to a plate 56 which is in turn welded to and extends crosswise of the metal channels which form the frame 20 of the tractor T.

FIG. 3 shows the position of the trailer front wheel axle structure when the tractor T has been turned to a position forty-five degrees to the left of the longitudinal centerline of the trailer Ta. The steering links 53 have rotated the trailer front wheel subframe 30 about the pivot bolt 32 so that the axis of the front wheel axle 31 is at an angle to the longitudinal centerline of the trailer.

The ideal condition of "tracking" the front wheels of the trailer with the rear wheels of the tractor in a turn is not quite reached in the practical aspect of the present embodiment, but this is of no great importance since the error is reduced as the turning angle of the tractor is reduced and most turns are less than forty-five degrees. It should be pointed out that as the steer links 53 swing the trailer front axle 31 about the pivot bolt 32, the distance between the front axle and the fifth wheel is reduced. This is accomodated by forward sliding of the plate 27 along the undersurfaces of the lower flanges of the channels 25,25. When the front axle of the trailer returns to its position at right angles to the trailer frame (the position shown in FIG. 2) the plate 27 will slide rearward.

Figure 7:
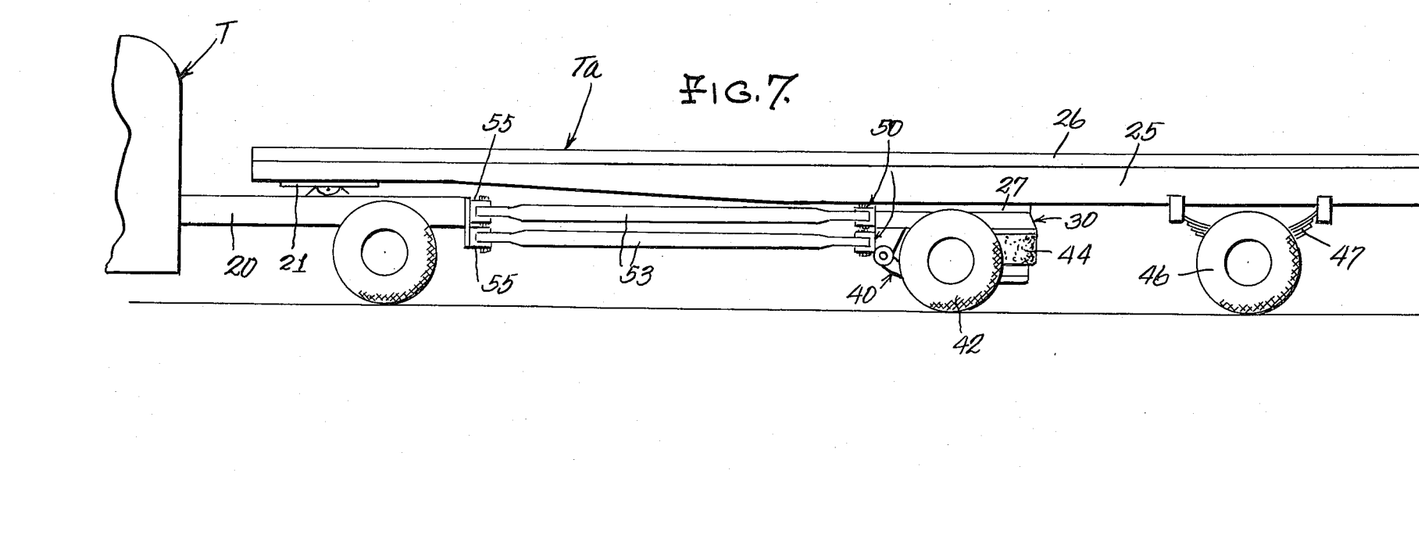
FIG. 7 is a side elevation of a tractor trailer, similar to that of FIG. 1, but showing the steer rods vertically displaced so as to be free of interengagement in any relative positions of the tractor and trailor.

FIG. 7 illustrates the same construction as described hereinbefore, with the exception that the clevises 50 and 55 are offset vertically on opposite sides of the longitudinal centerline of the tractor trailer so that the two steer links 53 are offset and therefore free of any intercontact in any relative positions of the tractor and trailer.

Figure 8:
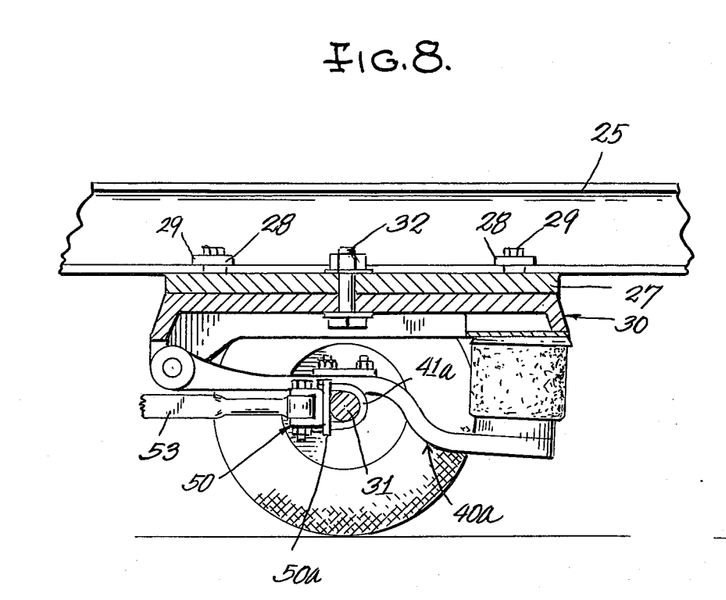
FIG. 8 is a fragmentary sectional view, similar to FIG. 4, but showing the steer rods connected directly to the front axle of the trailer.

As seen in FIG. 4, connection of the rear ends of the steer links with the front end of the subframe 30 establishes a leverage condition between the axis of the axle 31 and the link pivots 54. It is possible (and sometimes desirable) to connect the steer links directly to the front axle 31 and a construction to accomplish this is shown in FIG. 8. The trailer channels 25, plate 27, toe plates 28, subframe 30 and pivot bolt 32 are just about the same as described before. The carrier beams 40a are shaped somewhat differently so that the intermediate portion of each overlies the axle 31 and is held thereto by rubber-cushioned U-bolts, this construction being adapted to provide clearance for the steer links 53 and the clevises 50 to which they are pivoted. The clevises 50 are welded to plates 50a which receive the ends of U-bolts 41a.

DESCRIPTION OF OTHER EMBODIMENT

My invention may readily be adapted for "switch van" transportation, and FIGS. 9 through 16 show how this is accomplished. The "switch van" form of transportation has been considered desirable for cross-country hauling, and my said U.S. Pat. No. 3,003,636 discloses a practical and economical manner in which trailer beds may be placed on railroad flat cars.

Despite the disclosure of U.S. Pat. No. 3,002,636, many railroad yard still arrange the trailers on flat cars in "circus wagon" style, wherein the trailer wheels remain on the trailer and wherein such wheels, and wheel bearings, are subjected to the detrimental jarring and shaking of a travelling flatcar. In "circus wagon" transportation, the trailers are backed onto the end one of a string of flat cars by a tractor, and backed over the string of cars (bridge pieces spanning the adjoining ends of adjacent cars) to the opposite end one of the string of flat cars, where the landing gear is lowered and the tractor driven in the reverse direction over the string of cars to pick up another trailer. Most of the flat cars are of special construction to provide a stanchion for the front end of the trailer so as to relieve the landing gear of stress. Thus, such cars have no other use except for "piggy-back" hauling.

Loading a train in "circus wagon" manner requires a lot of time and labor, since only one trailer at a time may be loaded from said end one of the string of flat cars. Therefore, this "circus-wagon" form of transportation not only is costly to load and unload, but the jarring and shaking of the travelling flat cars is detrimental to the well being of the trailers. In the larger freight yards, huge cranes are available to bodily lift a trailer onto a flat car, but such cranes are expensive and also permit loading only one trailer at a time. Not only does the running gear of the trailer suffer because of the jarring and shaking, it represents an expensive part of the equipment as being tied up and an unusable investment. In my form of "slip van" transportation, the running gear is removed at the time the trailer bed is slid onto the flat car platform or dock. Further, the trailer beds are slid onto a flat car from a position at right angles to the longitudinal centerline of the flat car, and an ordinary lift truck is used to swing the trailer bed to longitudinal alignment with the flat car.

Figure 9:
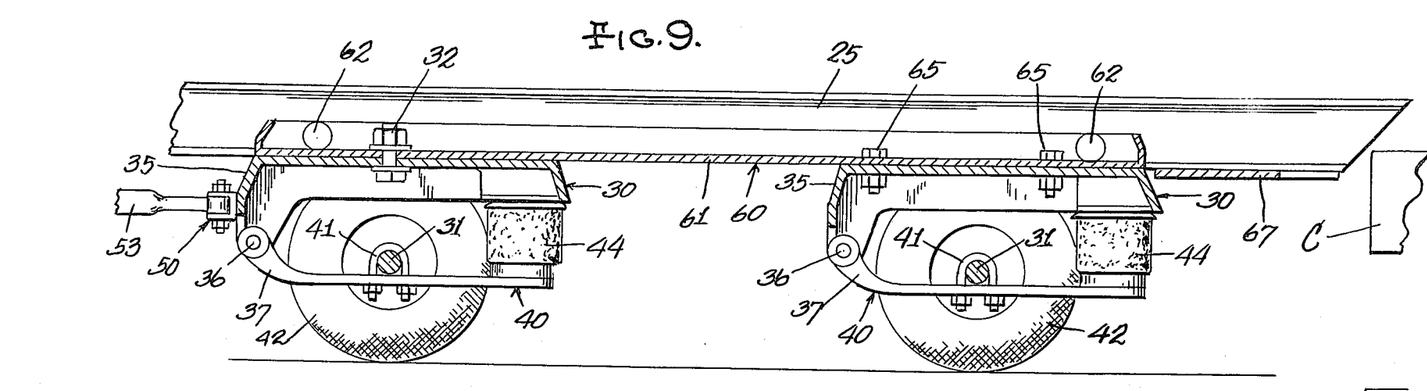
FIG. 9 is a fragmentary sectional view similar to FIG. 4, but showing a modified supporting frame that provides connection between both trailer axles.
Figure 10:
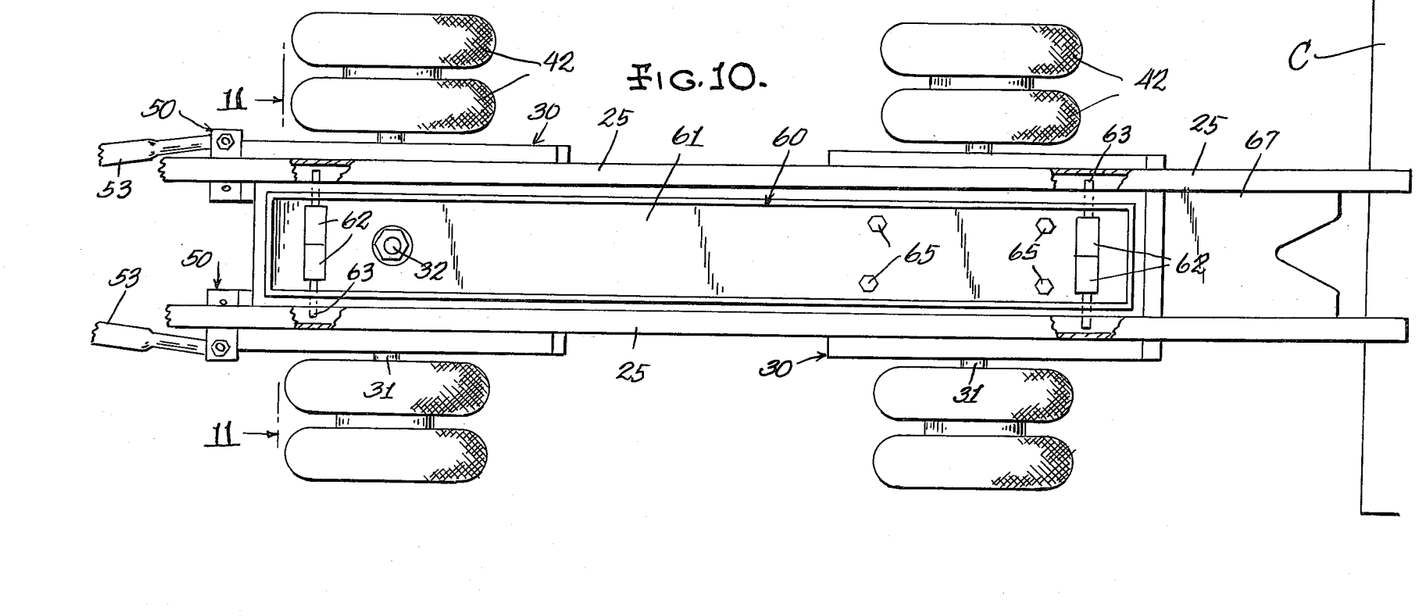
FIG. 10 is a top-plan view of the construction shown in FIG. 9.

To adapt the trailer construction heretofore described for "slip van" use, the former plate 27 is replaced by a fabrication 60 which comprises a flat bottom 61 with upstanding bounding side and end walls for strength purposes. The fabrication 60 is of a width to fit between the channels 25,25 of the trailer bed and of a length to span the two axles, as seen in FIG. 9.

Figure 11:
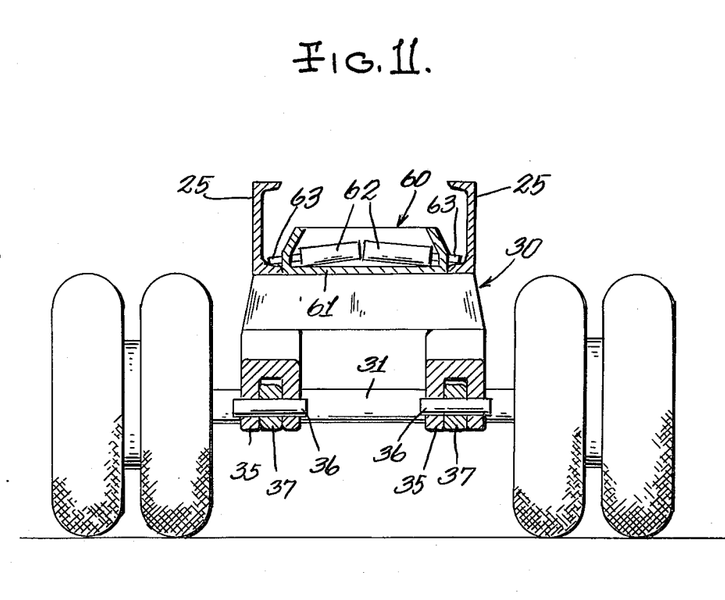
FIG. 11 is a sectional view corresponding to the line 11—11 of FIG. 10.

Suitable means may be provided to hold the fabrication 60 in a position so that the lower surface of the flat bottom 61 is in the plane of the undersurface of the bottom flange of the channels 25,25. In the illustrated embodiment, two air cylinders 62,62 are arranged in back-to-back relation at least at the forward and rearward ends of the fabrication 60. The piston rods 63 of the cylinders are spring-projected to extend through openings in the upstanding side walls of the fabrication and are adapted to be projected over the upward facing surface of the lower flanges of the trailer channels 25, as best seen in FIG. 11. The piston rods 63 hold the fabrication to sliding movement lengthwise of the trailer channels 25, and may be retracted by air under pressure admitted to the rod end of each cylinder so as to clear the lower flanges to provide for forward movement of the fabrication and the axles connected thereto and also for eventual total removal.

The forward and rearward axles, and their support, are shown as being substantially the same and similar parts for the rear axle will be designated with the same reference numbers. Thus, each axle 31,31 has a support comprising a subframe 30 that has a flat upper surface adapted to bear flatwise against the lower surface of the fabrication 60. As seen in FIG. 11, the subframe 30 is wide enough so that its flat upper surface bears against the flat undersurface of each lower flange of the channels 25,25. Each subframe, as before, is formed with a pair of knees 35 at the forward end thereof, each knee supporting a horizontally-disposed stub shaft 36 for rotatably receiving the forward end 37 of an arm 40. The intermediate part of a respective carrier beam is securely fastened to an axle 31 by means of rubber-cushioned U-bolts 41. An air bag 44 is disposed between the rear end portion of each carrier beam 40 and the aligned portion of the subframe 30.

The front axle structure is pivoted to the adjoining portion of the flat bottom 61 by a pivot bolt 32, and is provided with clevises 50 projecting forwardly from the knees 35 to pivotly receive the rear ends of the steer links. The rear axle structure differs in that it is firmly connected to the flat bottom 61 of the fabrication 60 by means of nuts and bolts 65, and the clevises 50 are not required and therefore omitted. The rear ends of channels 25,25 are angled to provide an angle surface for cam engagement with a loading dock or railway flat car C. Additional air may be admitted to the air bags of the rear suspension to elevate the rear of the trailer. A fifth wheel plate 67 with "V-shaped" throat and latch is welded to the underside of the channels 25,25 at the rear ends thereof for a purpose to appear later. In this disclosed embodiment, the steer links are in the form of telescoping sections, as suggested in FIGS. 12 and 13, with a retractable pin 68 to hold the sections in either one of its telescoped relations. A crane hook 69 is secured centrally to the forward end of the trailer bed to receive the lifting bar of a fork lift truck F.

Figures 12, 13:
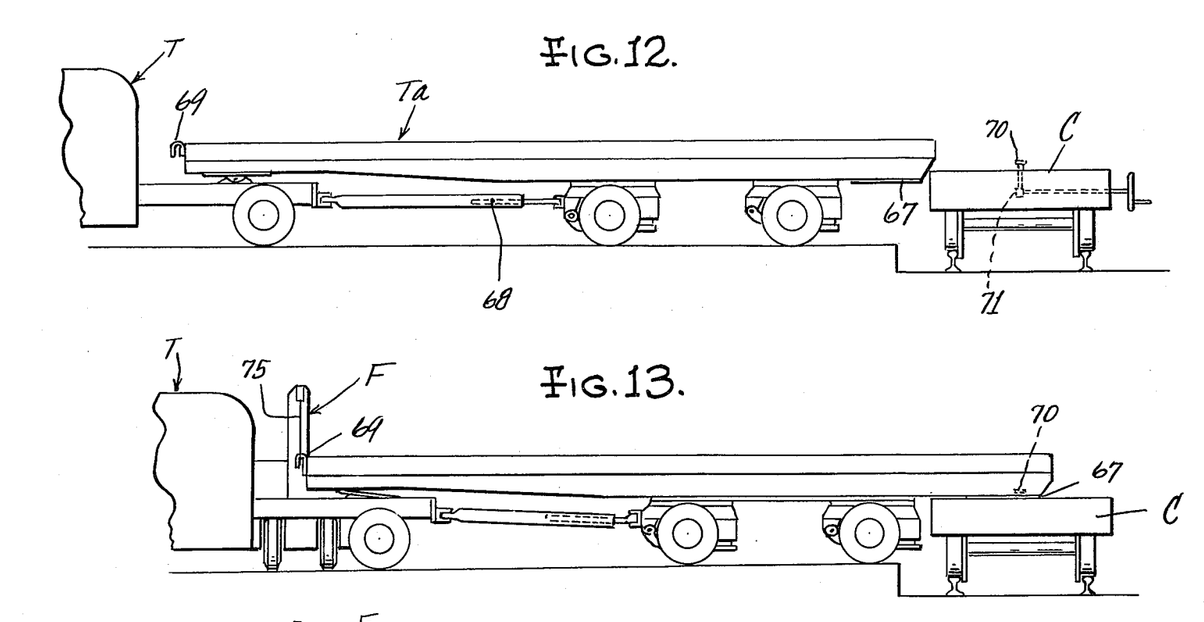
FIG. 12 is a small-scale side elevational view of the trailer with the supporting frame of FIG. 9, and showing the rear end of the trailer in position to be "humped" upon a support, such as a loading dock or railway car.
FIG. 13 is a view similar to FIG. 12, but showing the rear of the trailer resting on the support.
Figure 14:
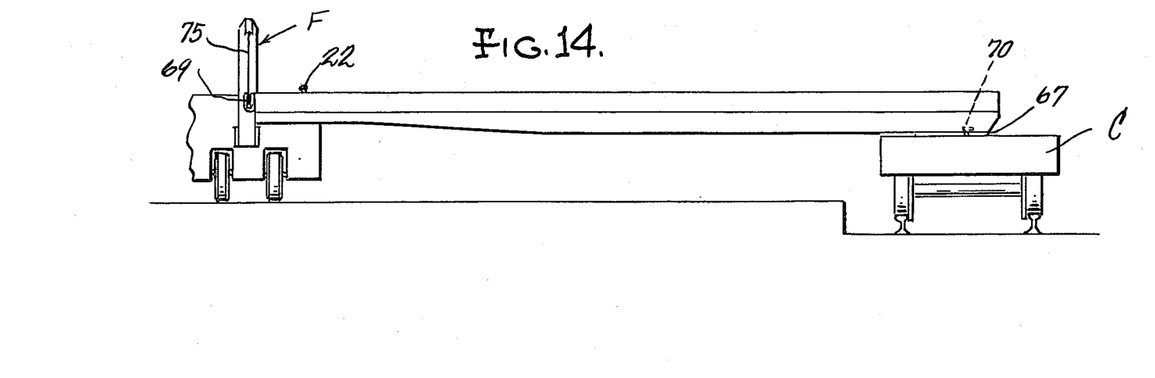
FIG. 14 is a side elevational view showing the rear end of the trailer resting upon the support, and the front end of the trailer supported by a lift truck, or supported for a period of time by a stiff-leg support standard or retractable landing gear.

In FIG. 12, the trailer Ta is shown in position transverse to the longitudinal centerline of a flat car C. The car has a king pin 70 which may be extended from the upper surface of the car, or retracted below such surface by a worm-and-gear arrangement 71 so that the car may be used as an ordinary flatcar.

The tractor T is used to back the trailer bed against the side of the flat car to position shown in FIG. 12. Air is now admitted to the rod end of the cylinders 62 to retract the piston rods 63, against spring action, clear of engagement with the upper surfaces of the lower flanges of the channels 25,25. The fabrication 60 is now supported only from the top surface of the subframe 30 and both axles may now move longitudinally of the bed channels 25,25, the side walls of the fabrication engaging the facing inturned end margins of the lower flanges of the channels to hold the fabrication against movement transversely of the bed channels.

The pin 68 is pulled from the telescoping sections of the steer links 53 and the tractor T is backed toward the flat car C and, through the fifth wheel plate 21 and king pin 22 connection between the tractor and trailer, the latter is humped onto the flat car to the position shown in FIG. 13. During the backing of the trailer, the brakes on the wheels of front and rear trailer axles are set, or the rear wheels are blocked, so that the bed channels move rearwardly over the stationary front and rear wheels. When the rear of the trailer bed has passed the longitudinal centerline of the flat car C (and assuming that the longitudinal centerline of the trailer bed has been aligned with the extended king pin 70 on the flat car) the king pin 70 will be seated within the fifth wheel slot and is latched therein.

The sections of the steer links 53 have telescoped and the pin 68 may be reinserted to lock the link sections against relative movement. The boom 75 of a lift truck F may now be connected to the crane hook 69 at the front of the trailer bed, and the front is lifted so that the tractor T may pull the trailer front and rear wheel axles 31,31, their subframes 30,30 and the fabrication 60 forwardly and clear of the trailer bed, so that, this assembly, as shown in FIG. 16, may be moved for coupling with another trailer bed, such as one being unloaded from a flat car.

In the event the rear end of the trailer bed is to be supported on a loading dock, a side swinging landing gear must be utilized to allow for wheel bogies to be removed as described.

Figures 15, 16:
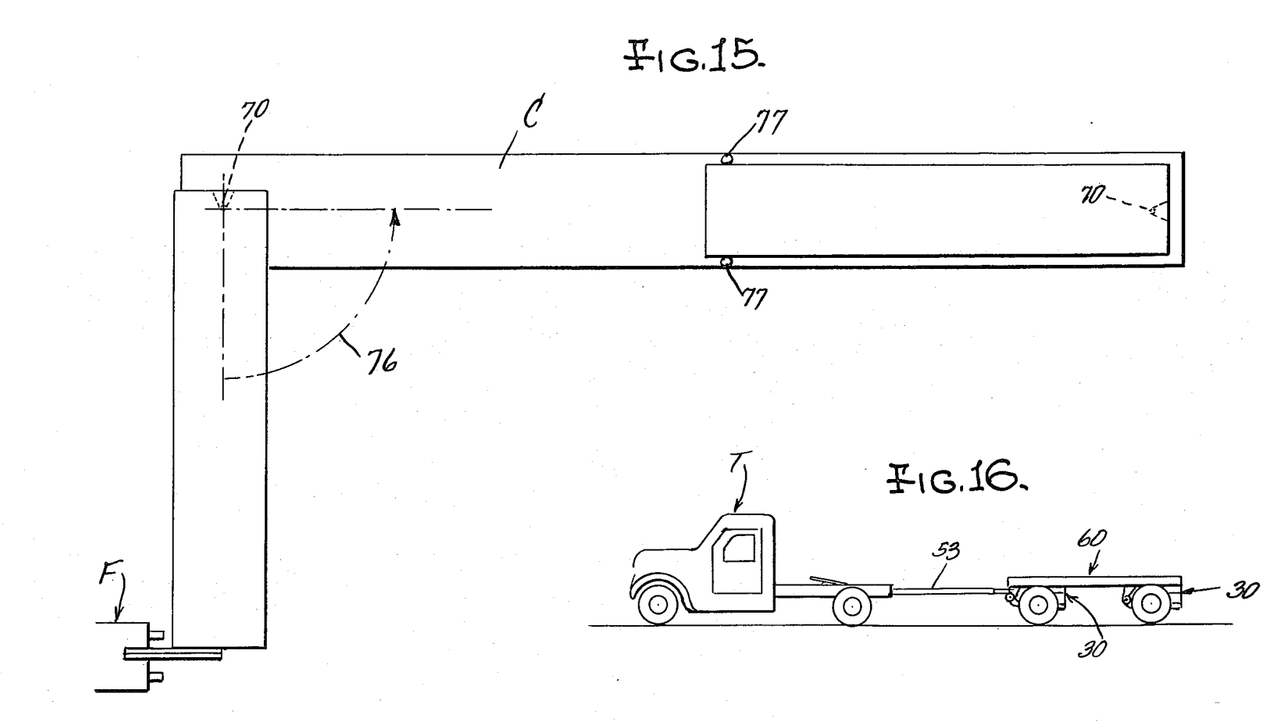
FIG. 15 is a small-scale top plan view showing one trailer disposed on a railway car, and another trailer in position to be moved onto the car or off the car.
FIG. 16 is a small-scale side elevational view showing the tractor towing the wheel bogies that have been removed from the trailer platform or van.

In FIG. 15, the trailer bed is shown with its rear end supported on a flat car, the flat car king pin 70 being seated in the slot of the rear fifth wheel plate 67, and the front end of the trailer bed is supported by the lift truck F. To dispose the trailer bed longitudinally on the flat car, the lift truck is operated through 90° to swing the trailer bed about the rear pivot provided by the king pin 70 on the flat car, as shown by the dotted line 76 in FIG. 15. The boom of the lift truck is then removed from the crane hook 69 at the front end of the trailer, and blocking means (such as the side posts 77 seating in recesses in the flat car) are installed to hold the trailer bed from swinging about the flat car king pin 70.

When the train reaches its destination, the trailer bed may be removed from the flat car, and front and rear wheels assembled with the trailer bed by a reversal of the steps above outlined. The advantages of the present system of loading a trailer bed on a flat car over the "circus wagon" type are many. For example, in the latter type of loading, special flat cars were required, and these cars could not be used for any other purpose. The special flat cars required heavy outside brackets at the longitudinal sides of the cars to keep the trailers from sliding off from either side of the flat car. The special cars also required longitudinally-extending center tracks to guide the trailer wheels. The special cars also needed bridging members therebetween for the wheels of the trailer and tractor to roll over when passing from one flat car to the next. Special cars also required stanchions to receive the trailer king pin and to support the load at the front of the trailer, and heavy chains were required to lock the trailers against movement.

Since the "circus-wagon" type of loading requires loading of the trailers (with wheels) from one end of a string of flat cars, a major bottle neck is created. Also, because the trailers are loaded with their wheels, flattening of wheel bearings occurs by reason of the constant shaking and jarring of a moving flat car. Also, in such case, the center of gravity of the loaded flat car is much higher, tending to create an unsafe condition, and the higher load on the flat car creates problems in passing through bridges and tunnels. In the "switch-van" embodiment, any trailer bed or van may be removed out of a string of cars along a team track. No one bed interferes with any other bed in either the loading or unloading process.

I claim:

1. In a roadway trailer having a kin pin at its forward end adapted to be connected to a fifth wheel at the rear of a tractor for establishing towing relation between said tractor and trailer and for supporting the forward portion of the trailer for pivotal movement about the vertical axis provided by said king pin, said trailer including a load-bearing bed supported by a pair of steel bed channels whose upper and lower flanges are in facing relation, said bed channels extending longitudinally of said bed and disposed on opposite sides of the centerline of said bed, forward and rearward sets of load-supporting wheel assemblies spaced longitudinally of said trailer, said forward set of wheel assemblies incorporating an axle normally disposed crosswise of said load-bearing bed but swingable about a vertical pivot and including a supporting plate, subframe and suspension, said supporting plate being confined to movement longitudinally of and along said channels, said subframe underlying said supporting plate and having an upper horizontally-disposed surface engaging a lower surface of said supporting plate, a vertically-extending pivot rod connecting said subframe to said supporting plate and providing said vertical pivot about which said axle is swingable, said subframe having a pair of knees extending forwardly therefrom and disposed on opposite sides of said pivot, a horizontally-extending stub shaft carried by each of said knees, a carrier beam for each stub shaft, said beams being laterally spaced and extending in a direction longitudinally of said bed and having a forward end pivotally connected to its respective stub shaft so that its rearward end may swing in a vertical direction, said axle extending crosswise of said beams and firmly connected to each beam at an intermediate portion thereof, opposite ends of said axle rotatably supporting road-engaging wheels, road-shock-cushioning means between each beam and an overhanging portion of said subframe, and means for effecting swinging of said subframe about said vertical axis.

2. The construction according to claim 1 wherein a plurality of means are carried by said supporting plate for sliding engagement with the upper surface of the lower flange of each bed channel at spaced places therealong to support said support plate for movement longitudinally of said bed channels.

3. The construction according to claim 2 wherein said plurality of means comprises a plurality of toe plates bolted to said support plates and extending upwardly therefrom and overlying and slidably engaging the upper surface of the lower flange of each bed channel.

4. The construction according to claim 2 wherein said plurality of means comprises a plurality of shiftable rods carried by said support plate and shiftable to overlie and slidably engage the upper surface of the lower flange of each bed channel.

5. The construction according to claim 4 wherein said support plate has upstanding side walls which are generally parallel to said bed channels, said support plate fitting between the facing lower flanges of said bed channels, with said side walls adjoining said lower flanges, said side walls having openings to pass respective rods so that the latter may be shifted to overlie and slidably engage the upper surface of the lower flange of each bed channel.

6. The construction according to claim 5 wherein said support plate is extended in a direction longitudinally of said bed channels to overlie the axle of said rearward set of wheels, the latter axle being connected to said support plate.

7. The construction according to claim 6 wherein said latter axle is connected to said support plate in nonswingable relation.

8. The construction according to claim 6 wherein a second subframe underlies said support plate and is connected thereto in fixed manner, said second subframe having a pair of knees and stub shafts, pivoted carrier beams connected to said latter axle, and road-shock-cushioning means.

9. The construction according to claim 1 wherein said means for effecting swinging of said subframe comprises a pair of longitudinally-extending steer links on opposite sides of the centerline of said load-bearing bed, each link having its rearward and forward ends respectively connected to said axle and to the rear of said tractor, said links being constructed and arranged to translate steering displacement of said tractor from the longitudinal centerline of said bed to corresponding swinging movement of said axle.

10. The construction according to claim 9 wherein the rearward ends of said links are each connected to a vertical pivot extending from a subframe knee.

11. In a roadway trailer having a king pin at its forward end adapted to be connected to a fifth wheel at the rear of a tractor for establishing towing relation between said tractor and trailer and for supporting the forward portion of the trailer for pivotal movement about the vertical axis provided by said king pin,
    said trailer including a load-bearing bed supported by a pair of steel bed channels whose upper and lower flanges are in facing relation, said bed channels extending longitudinally of said bed and disposed on opposite sides of the centerline of said bed,
    forward and rearward sets of load supporting wheel assemblies spaced longitudinally of said trailer,
    said forward set of wheel assemblies incorporating a totally self-contained axle normally disposed crosswise of said load bearing bed but swingable about a vertical pivot, and including a support plate, a subframe and a suspension,
    said support plate having an upper horizontally-disposed flat surface slidably bearing against the undersurface of the lower flanges of said bed channels,
    a plurality of members connected to said support plate at spaced places and each adapted to overlie and slidably engage the upper surface of the lower flange of said bed channels, whereby said support plate is confined to movement longitudinally along said lower flanges,
    said subframe underlying said support plate and having an upper horizontally-disposed flat surface engaging a horizontally-disposed lower flat surface of said support plate,
    a vertically-extending pivot rod connecting said subframe to said support plate to provide said vertical pivot about which said forward set of wheel assemblies is swingable,
    said subframe having a pair of knees extending forwardly therefrom and disposed on opposite sides of said pivot,
    a horizontally-extending stub shaft carried by each of said knees,
    a carrier beam for each stub shaft, said beams having laterally-spaced and extending in a direction longitudinally of said bed and having a forward end pivotally connected to its respective stub shaft so that its rearward end may swing in a vertical direction,
    said self-contained axle extending crosswise of said beams and firmly connected to each beam at an intermediate portion thereof, opposite ends of said axle rotatably supporting road-engaging wheels,
    road-shock cushioning means between the rearward end of each beam and an overhanging portion of sais subframe, and
    means for swinging said subframe about said vertical pivot.

12. The construction according to claim 11 wherein said cushioning means takes the form of an air bag.

13. The construction according to claim 11 wherein the rearward set of load supporting wheel assemblies includes an axle which is beneath and crosswise of said load bearing bed and held against swinging movement.

14. The construction according to claim 11 wherein said plurality of members comprise a plurality of toe plates bolted to said support plate and having upper portions overlying and slidably engaging the upper surface of the lower flange of said of said bed channels.

15. The construction according to claim 11 wherein said means for effecting swinging of said subframe comprises a pair of longitudinally-extending steer links on opposite sides of the centerline of said load bearing bed, each link having a forward end pivotally connected to the rear of said tractor and a rearward end pivotally connected to a respective knee.

16. The construction according to claim 11 wherein said support plate is elongated in a direction lengthwise of said load-bearing bed, said plate being of a width to fit between the facing lower flanges and having rod means at a plurality of places along the long sides thereof to overlie and slidably engage the upper surface of the lower flange of each bed channel,
    the rearward set of load supporting wheel assemblies including a second subframe which underlies said support plate and is rigidly connected thereto,
    said subframe supporting a second axle in nonswingable position underneath and crosswise of said load-bearing bed and tied to said first named axle through said support plate.

17. The construction according to claim 16 and including means to retract said rod means to a position wherein they are free of engagement with the flanges of said bed channels, whereby said trailer bed and said support plate may be relatively moved along the longitudinal centerline of said bed.

18. The construction according to claim 17 wherein said support plate and said forward and rearward set of load supporting wheel assemblies may be moved clear of said trailer bed.

19. The construction according to claim 18 wherein the rear of said trailer bed has an inclined undersurface constructed and arranged so that said trailer bed may be cammed upwardly and upon a support surface, such as a shipping dock or railway flatcar, through backing action of said tractor transmitted to said trailer.

* * * * *